(No Model.)

C. S. BRADLEY.
TRANSFORMER AND MEANS FOR DEVELOPING ROTARY MAGNETIC FIELDS.

No. 492,480. Patented Feb. 28, 1893.

Witnesses

Inventor
Charles S. Bradley
by Read & Price
his Attorneys

UNITED STATES PATENT OFFICE.

CHARLES S. BRADLEY, OF AVON, NEW YORK.

TRANSFORMER AND MEANS FOR DEVELOPING ROTARY MAGNETIC FIELDS.

SPECIFICATION forming part of Letters Patent No. 492,480, dated February 28, 1893.

Application filed March 17, 1892. Serial No. 425,334. (No model.)

*To all whom it may concern:*

Be it known that I, CHARLES S. BRADLEY, a citizen of the United States, residing at Avon, in the county of Livingston and State of New York, have invented certain new and useful Improvements in Transformers and Means for Developing a Rotary Magnetic Field; and I do hereby declare the following to be a full, clear, and exact description of the invention, such as will enable others skilled in the art to which it appertains to make and use the same.

This invention relates to alternating current transformers, the object being to develop from a simple alternating current a polyphase alternating current.

In a prior patent issued to me No. 409,450 of August 20, 1889, was described a system of transmission of power in which a three-phase alternating current was transmitted over three line wires and used to create a rotation of magnetism in a closed coil armature. Alternating current motors when operated by a single alternating current are accompanied, as usually constructed, by two serious objections, namely, a very high self-induction and wear upon the commutator by reason of the excessive sparking. By means of a polyphase current a rotation of magnetism may be developed without the use of a commutator and with slight self-induction. It is desirable to develop polyphase currents for operating the motor from a single alternating current circuit, thus admitting of a minimum use of copper in the main circuit and resulting in a cheapening of the expense of installation.

My invention comprises means for shifting the phases of the alternating current in two or more circuits of a transformer and by the combined action of the resulting currents developing a rotation of magnetism by which there may be induced in the secondary or induced circuit as many phases of current as may be desired.

The invention comprises various features which will be more particularly hereinafter described and the novelty of which will be definitely indicated in the claims appended to the specification.

Figure 2:
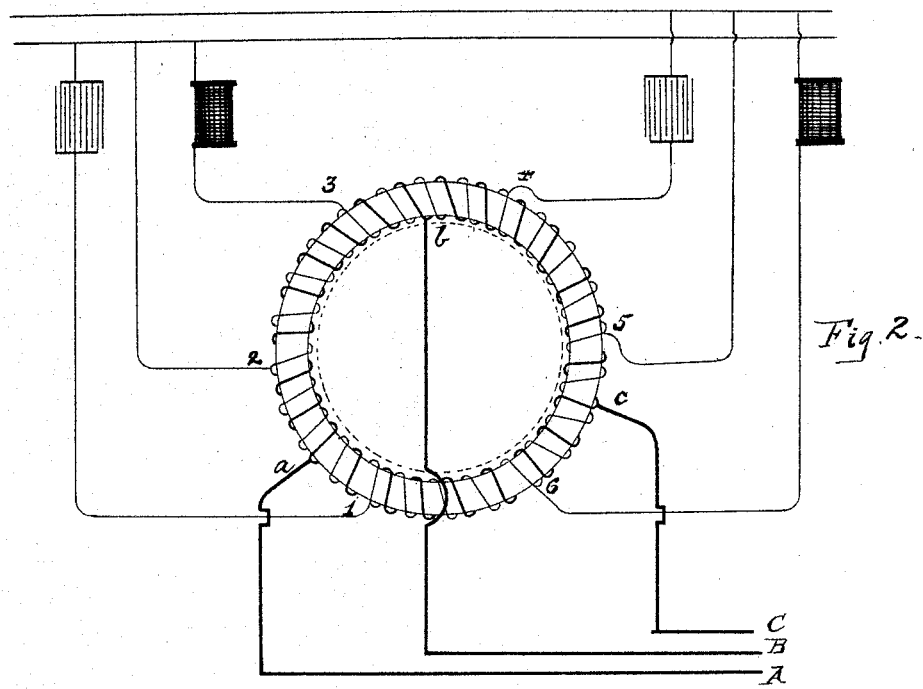
Figure 1:
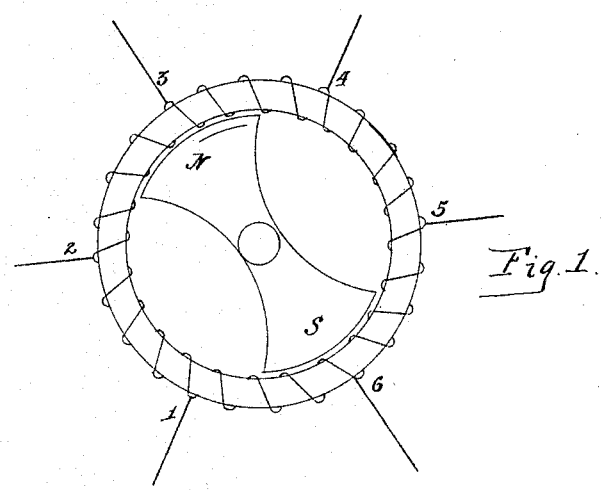

In the accompanying drawings which represent the invention, Figure 1 is a diagram showing how from a ring winding currents of differing phase may be developed, and Fig. 2 is a diagram of a transformer embodying my invention.

In Fig. 1 suppose N, S, to represent a field-magnet having north and south polarities developed at its extremities and capable of rotation within a ring A wound with a closed circuit. Suppose this winding to be tapped at six equi-distant points, as indicated at 1, 2, 3, 4, 5, 6. If each pair of diametrically opposite points be connected with three external circuits there will be developed in these circuits three alternating currents differing from each other in phase by sixty degrees. If, now, we reverse the process and suppose that an alternating current were led to the points 1, 2 and 3, and some device were interposed at these points to cause the current to lag so that the current entering through 2 will be displaced sixty degrees with reference to the current entering through 1, and the current entering through 3 will be displaced sixty degrees with reference to current entering at 2 the resultant magnetism developed in the ring would be caused to rotate therein so as to drag the field-magnet N, S, around in the direction of the arrow. Such a system might obviously be used to operate an electro-motor.

If in place of the field-magnet N, S, there were wound upon the ring a second circuit and this circuit were tapped at several points and connected with an external circuit obviously there would be delivered at the several points of connection electro-motive-forces varying in phase, so that polyphase currents might be led from this circuit.

Efforts have heretofore been made to produce a rotation of magnetism in a motor by two currents, one of which is lagged behind the other. The lag is usually accomplished by interposing an electro-magnet in the path of the current which by its reactive effect causes a displacement of phase, and the current of displaced phase is used in combination with the main current to develop shifting poles. But it is difficult to get sufficient lag to produce a uniform rotary field by the action of two currents. I have therefore designed a system by which a rotary field having little fluctuation may be produced by a number of lagging currents which may be easily derived from a single alternating current. We may without great loss of energy produce a lag of sixty degrees by interposing a reaction device such as an electro-magnet in the path of an alternating current. We thus have the means of developing at a small expense of energy the required displacement of phase between the points 2 and 3, for if the alternating current be led directly to the point 2 and to the point 3 through a properly constructed reaction device, the current passing into the coil at these points will be one-sixth of a period apart. If, now, we interpose at the point 1 a condenser we may cause a displacement of phase of sixty degrees between the currents entering at 1 and 2, and the condenser has the property of creating an anticipation or lead in phase instead of lag. This is probably due to the fact that it requires time to charge up the condenser which in its discharge assists the second half of the charging wave of an alternating current, so that an alternating current led directly to the ring coil at the point 2 and through a condenser at the point 1 may be made to flow through the coil from the point 1 one-sixth of a period sooner than it will flow through the coil from the point 2. Thus we may by tapping a coil at points sixty degrees apart cause current from a simple alternating circuit to enter the coils at the points tapped one-sixth of a period apart, and attain with efficiency a rotation of magnetism in the magnetic core about which the coil is wound. For example, in the diagram Fig. 2 the points 2 and 5 may be connected directly or if desired through a non-inductive resistance with the opposite sides of the alternating current mains. The points 1 and 4 may be connected through condensers with corresponding sides of the alternating current mains and the points 3 and 6 may be similarly connected through an electro-magnet or through a reaction coil or equivalent lagging device with corresponding sides of the alternating current circuit, and the alternating waves passing over the main will enter the winding with its phases displaced. I prefer to place the phasing devices at each side of the transformer, as shown, so as to avoid short circuiting. The secondary winding may be tapped at three or more points as indicated at $a\ b\ c$ and connected with an external circuit A B C and used to operate polyphase electro-motors of the kind contemplated in my patent above noted, or of any other proper construction.

If desired, iron may be introduced within the ring as indicated in dotted lines to reduce the air gap between the poles and lower the reluctance of the magnetic circuit.

While I have illustrated a closed coil winding on the ring both for the primary and secondary circuits, the invention is not restricted to such a winding, as it is evident that independent coils connected with the non-inductive, condenser, and reaction coil leads would develop a rotation of magnetism in the ring. The condenser and reaction coil should of course be properly proportioned to give the best results for the frequency and strength of the current to be converted.

Having thus described my invention, what I claim as new, and desire to secure by Letters Patent, is—

1. A magnetic circuit supplied at a plurality of points from a simple alternating current circuit through a condenser, a non-inductive conductor and a reaction coil respectively to develop a difference of phase and produce rotation of magnetic poles.

2. A magnetic circuit provided with a closed coil winding tapped at six points and connected through a condenser, a non-inductive conductor and a reaction coil with a simple alternating current circuit to develop a difference of phase and develop a rotation of magnetic poles.

3. A transformer for converting a simple alternating current into polyphase currents having its primary winding connected at a plurality of points with said simple alternating current circuit through a condenser, a non-inductive conductor and a resistance coil respectively to develop a difference of phase in current entering at said points, whereby a rotation of magnetism may be developed and having its secondary winding connected with consumption circuits.

4. A transformer for converting a simple alternating current into polyphase currents having its primary windings connected to said circuit through a reaction coil and a condenser at points displaced so as to develop a rotation of magnetism and provided with a secondary winding tapped at a plurality of points for connection with consumption circuits.

5. A transformer for converting a simple alternating current into polyphase currents having a closed coil primary winding tapped at six equi-distant points and connected through a condenser, a non-inductive wire and a reaction coil with a simple alternating current circuit, and provided with a secondary winding tapped to discharge into a polyphase consumption circuit.

In testimony whereof I affix my signature in presence of two witnesses.

CHARLES S. BRADLEY.

Witnesses:
VICTOR E. BURKE,
ROBT. H. READ.